United States Patent [19]

Mody et al.

[11] Patent Number: 4,724,452

[45] Date of Patent: Feb. 9, 1988

[54] SHUTTER

[75] Inventors: Hemant K. Mody; David L. White; Ashok Murthy, all of Rochester, N.Y.

[73] Assignee: Eastman Kodak Company, Rochester, N.Y.

[21] Appl. No.: 926,616

[22] Filed: Nov. 3, 1986

[51] Int. Cl.$^4$ .............................................. G03B 9/00
[52] U.S. Cl. ................................................ 354/234.1
[58] Field of Search ............... 354/234.1, 227.1, 245, 354/248, 249

[56] References Cited

U.S. PATENT DOCUMENTS

| | | | |
|---|---|---|---|
| 3,110,824 | 11/1963 | Flanagan | 354/234.1 |
| 3,176,170 | 3/1965 | Fulton et al. | 354/245 X |
| 3,561,847 | 2/1971 | Kitsopoulos et al. | 350/272 |
| 3,820,144 | 6/1974 | Neau et al. | 354/234.1 |
| 3,987,473 | 10/1976 | Kondo | 354/234.1 |
| 4,024,552 | 5/1977 | Kondo | 354/234.1 |
| 4,410,251 | 10/1983 | Lee | 354/25 |

Primary Examiner—Donald A. Griffin
Attorney, Agent, or Firm—Donald D. Schaper

[57] ABSTRACT

A shutter is disclosed for use as a high-speed shutter in a camera or an electronic device. The shutter comprises a planar aperture blade which is mounted for reciprocative movement. The aperture blade includes a coil which is part of an electromagnetic actuator. A permanent magnet is mounted adjacent the blade for interaction with a magnetic field produced by the coil. In order to provide for a low-friction support, the aperture blade is supported on flexible connectors located on opposite sides of the blade. A current of one polarity is supplied to the coil to move the aperture blade in one direction, and the polarity of the current is reversed to move the blade in the opposite direction.

14 Claims, 3 Drawing Figures

SHUTTER

FIELD OF THE INVENTION

The present invention relates to a shutter, and more particularly, to a planar shutter which is adapted to function at high speeds over long periods of usage.

DESCRIPTION OF THE PRIOR ART

Electromagnetically-actuated planar shutters for use in cameras are known in the art. For example, U.S. Pat. No. 4,024,552, discloses an electromagnetically-actuated device in which a conductive coil is embedded in an opaque plastic shutter blade. The blade is slidably mounted in grooves in a camera body, and a permanent magnet is positioned to interact with a magnetic field of the coil. When a current is supplied to the coil, the blade is moved in one direction, and when the current is turned off, return springs move the blade to a rest position. A problem with the device shown in the patent is that relatively high frictional forces result from mounting the blade in grooves, and thus, a large amount of current is needed to drive the blade. Further, the use of springs to return the blade to a starting position limits the control over the return speed of the blade. For these reasons, the device is not suitable for certain applications, for example, in electronic cameras where the shutter is actuated several times per second over a long period of time.

SUMMARY OF THE INVENTION

It is an object of the present invention to overcome the problems in the prior art and to provide an improved shutter which is very durable and can be continuously operated at high speeds.

In accordance with the present invention, there is provided a shutter for use in controlling light along an optical axis, the shutter comprising: a housing; an aperture blade; means for moving the blade along a path between an open position in which light can pass along the optical axis and a closed position in which no light can pass along the axis; and support means for supporting the blade in the housing for movement along the path, the support means comprising connector means fixed to the housing and to the blade for movement therewith, and the support means exerting a force on the blade in a direction transverse to the path to position the blade relative to the housing.

In one embodiment of the present invention, an aperture blade is supported for reciprocative movement by means of flexible connectors located on opposite sides of the blade. The blade includes a coil on a surface thereof which is adapted to receive an electric current through the connectors. A permanent magnet is mounted adjacent the blade to interact with the magnetic field of the coil. When a current flowing in one direction is supplied to the coil, the aperture blade moves in one direction, and when the current is reversed, the blade is moved in an opposite direction.

A principal advantage of the present invention is the low-friction support for the aperture blade which is achieved by means of the disclosed support means. As a result of the use of flexible connectors to support the aperture blade, a relatively small force is required to start, stop, and reverse the direction of the aperture blade, and consequently, the blade can be driven with a low current. The small driving force facilitates control of the movement of the blade and thus makes the blade particularly suitable for high speed applications. The use of low-friction support results in low wear on the shutter elements and thereby extends the life of the shutter.

Other features and advantages will become apparent from reference to the following description of the Preferred Embodiment when read in light of the attached drawings.

DESCRIPTION OF THE PREFERRED EMBODIMENT

Figure 1:
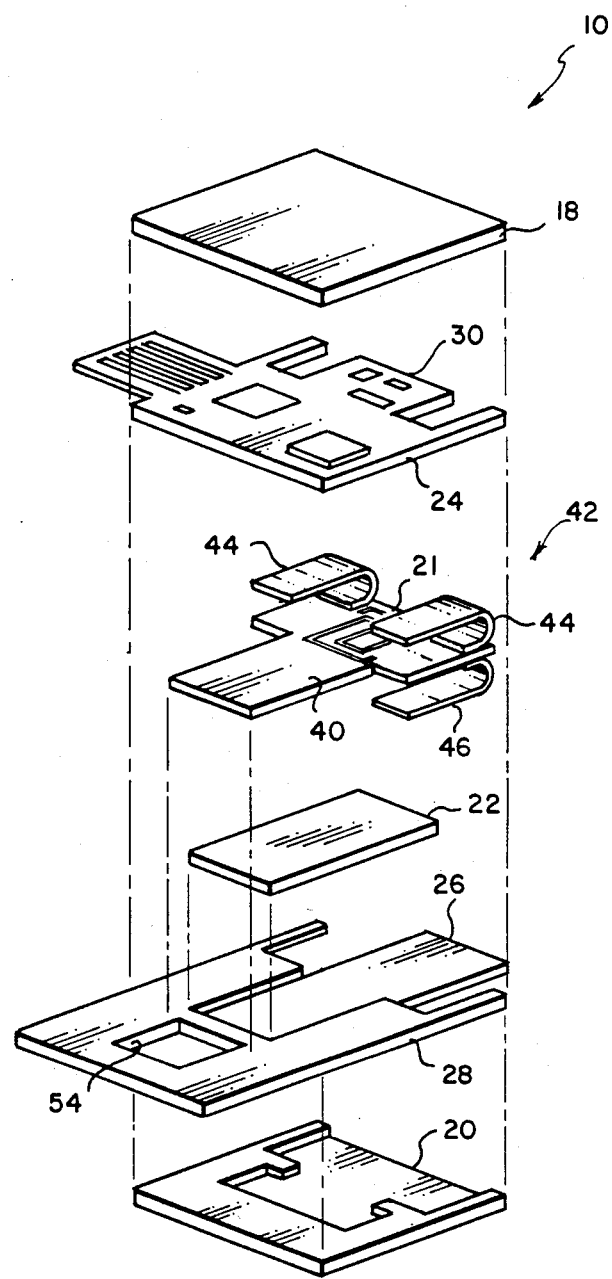
FIG. 1 is an exploded perspective view of the shutter of the present invention.

With reference to FIG. 1, there is shown a shutter 10 constructed in accordance with the present invention. Shutter 10 comprises an aperture blade 12 which is mounted for movement in a shutter housing which includes a top housing member 18 and a bottom housing member 20. Aperture blade 12 includes a coil 21 which is adapted to receive an electrical current to drive blade 12. A permanent magnet 22 is mounted adjacent blade 12 in a position to interact with coil 21. A top flux plate 24 is mounted adjacent coil 21, and a bottom flux plate 26 is mounted under magnet 22 in a plate 28. The drive circuit (not shown) for shutter 10 is carried on a printed-circuit board 30 which is mounted adjacent top housing member 18.

Aperture blade 12 includes an optical plate 40 which can be formed of any material which is impervious to light. However, a preferred material for plate 40 is an opaque plastic. Coil 21 can be formed directly on plate 40 by, for example, printed circuit techniques.

Figure 2:
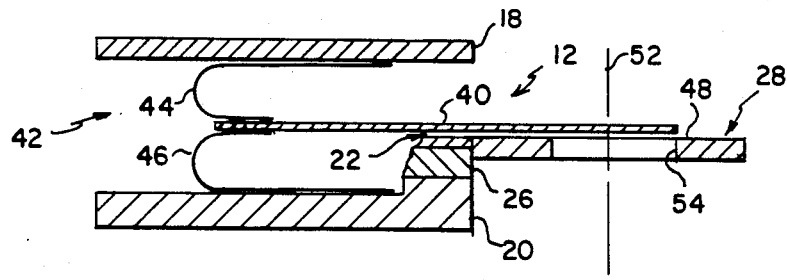
FIG. 2 is an elevational view showing the shutter in a closed position, with certain parts of the shutter omitted to more clearly show the position of the aperture blade.
Figure 3:
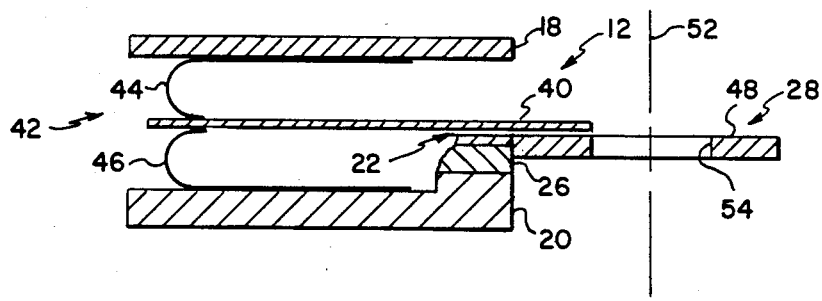
FIG. 3 is an elevational view similar to FIG. 2, but showing the shutter in an open position.

An important feature of the present invention is the construction of a support means 42 for aperture blade 12. Support means 42 supports aperture blade 12 for reciprocative movement between a closed position (FIG. 2) in which plate 40 covers an aperture 54 in plate 28, and an open position (FIG. 3) in which light can pass through aperture 54. As shown in FIGS. 2 and 3, aperture 54 is located along an optical axis 52. Support means 42 includes two pairs of flexible connectors 44, 46, with a pair of connectors 44, 46, arranged on each side of plate 40, as shown in FIG. 1. Each of the flexible connectors 44 is fixed to top housing member 18 and to plate 40, and each of the flexible connectors 46 is fixed to bottom housing member 20 and to plate 40. As shown in FIGS. 2 and 3, optical plate 40 is supported for movement between connectors 44 and connectors 46. Under some operating conditions, plate 40 can lightly abut against a surface 48 of plate 28 during movement of the plate 40. Surface 48 can be coated with a low-friction material, such as a tetrafluoroethylene polymer, obtainable from the Dupont Co. under the trademark Teflon.

Flexible connectors 44, 46, are preferably made of stainless steel, but connectors 44, 46, can also be made of phosphor bronze. The connectors 44, 46, are made just thick enough to have sufficient rigidity to support blade 12, since the thinner the connector, the less resistance the connector offers to movement of the blade 12.

When the connectors 44, 46, are mounted, as shown in FIGS. 2 and 3, there is a slight compressive force on plate 40. As shown in FIGS. 2 and 3, the connectors 44, 46, are generally U-shaped, and, in effect, coil and uncoil when blade 12 moves from an open to a closed position. Since there is no sliding friction between connectors 44, 46, and housing members 18, 20, the connectors 44, 46, operate with negligible mechanical friction. As an illustrative example, if aperture 54 is approximately one centimeter square, an aperture blade could have a weight of approximately 0.016 grams and the connectors could be made of a stainless steel strip having a thickness of 0.001 inches.

Optical plate 40 is electromagnetically actuated to move between a closed position (FIG. 2), in which light along optical axis 52 is blocked from passage through aperture 54 in plate 28, and an open position (FIG. 3) in which light can pass through aperture 54. When a current flowing in one direction is supplied to coil 21, plate 40 moves in one direction, and when the current in coil 21 is reversed, the plate 40 moves in an opposite direction. In a preferred method of applying current to coil 21, the current is supplied to the coil through connectors 44, 46, in pulses of constant amplitude. The pulse duration is modulated to control aperture size, and the number of pulses applied to the coil controls the shutter time. Thus, pulses of a selected duration, magnitude and a first polarity are applied to coil 21 to drive plate 40 to an open position, and pulses of an opposite polarity are applied to coil 21 to drive plate 40 to a closed position. A more complete explanation of the use of pulses to drive an aperture plate is contained in commonly-assigned U.S. Pat. No. 4,408,857, granted Oct. 11, 1983, and this patent is expressly incorporated herein by reference.

One application of the present invention is in an electronic camera (not shown) of a type used to inspect products moving along an assembly line. In sucb a use, shutter 10 would be actuated by a sensor to open and close each time a new product passes by the camera. With shutter 10 in an open position, light from a strobe (not shown) would be reflected from a product through aperture 54 and onto a bank of photosensors (not shown). A shutter for use in such an electronic camera must be very durable, since the shutter is actuated several times per second over long periods of time. Further, since the products do not pass at regular intervals, the shutter cannot be run at a constant rate, and, thus, the shutter must be actuatable with very little lag time. It is also contemplated that shutter could be used as a focal plane shutter in a photographic camera.

The invention has been described in detail with particular reference to a preferred embodiment thereof, but it will be understood that variations and modifications can be effected within the spirit and scope of the invention.

What is claimed is:

1. A shutter for use in controlling light along an optical axis, said shutter comprising:
   a housing;
   an aperture blade;
   means for moving said blade along a generally linear path between an open position in which light can pass along said optical axis and a closed position in which no light can pass along said axis; and
   support means for supporting said blade in said housing for movement along said path, said support means comprising connector means fixed to said housing and to said blade for movement therewith, said support means exerting a force on said blade in a direction transverse to said path to position said blade relative to said housing and said support means exerting essentially no force on said blade in a direction parallel to said path during movement of said blade.

2. A shutter, as defined in claim 1, wherein said aperture blade includes a coil for receiving a current to drive said blade.

3. A shutter, as defined in claim 2, wherein said blade is adapted to move in a first direction when said current is of one polarity and in a reverse direction when said current is of the opposite polarity.

4. A shutter, as defined in claim 3, wherein said current is supplied to said coil through said connector means.

5. A shutter, as defined in claim 1, wherein said connector means comprises a flexible connector having a first end fixed to said housing and a second end fixed to said blade.

6. A shutter, as defined in claim 5, wherein said connector means comprises a second flexible connector having one end connected to said housing and another end connected to said blade, and said blade is supported between said connectors.

7. A shutter, as defined in claim 5, wherein said flexible connector is a strip of metal folded back upon itself.

8. A shutter, as defined in claim 7, wherein said metal is stainless steel.

9. A shutter, as defined in claim 7, wherein said metal is phosphor bronze.

10. A shutter for use in controlling passage of light through an aperture located along an optical axis, said shutter comprising:
    a housing;
    an aperture blade movable relative to said housing to cover and uncover said aperture, said blade supporting a coil which is adapted to receive an electrical current;
    a generally planar magnet spaced from said blade and positioned to interact with a field produced by said coil to effect movement of said blade; and
    support means for said blade, said support means comprising connector means having a portion fixed to said housing and a portion fixed to said blade for movement therewith, and said connector means exerting substantially no resistance to the movement of said blade along said path.

11. A support for a movable element, said support comprising:
    a housing member;
    an element supported by said housing member for movement along a path;
    a flexible connector formed from a strip of material folded back upon itself and having one leg connected to said housing and a second leg connected to said element, each of said legs changing length during movement of said element, said connector exerting a force on said element in a direction transverse to said path and essentially no force on said element in a direction parallel to said path during movement of said element; and
    means operable with said connector for maintaining said element in said path.

12. A support, as defined in claim 11, wherein said means operable with said flexible connector is a second flexible connector.

13. A shutter for use on controlling light along an optical axis, said shutter comprising:
   a housing comprising a first member and a second member spaced a fixed distance from said first member;
   an aperture blade;
   means for moving said blade along a path between an open position in which light can pass along said optical axis and a closed position in which no light can pass along said axis; and
   support means for supporting said blade in said housing for movement along said path, said support means comprising a pair of generally U-shaped flexible connectors disposed between said first member and said second member, one of said connectors being connected to said first member and to said blade and the other connector being connected to said second member and to said blade, and said aperture blade being supported between said connectors.

14. A shutter, as defined in claim 13, wherein said support means comprises a second pair of generally U-shaped flexible connectors disposed between said first member and said second member, and said aperture blade is supported between said second pair of connectors.

* * * * *